VARIATIONS OF CONVERSION, ULTIMATE YIELD AND YIELD PER PASS DURING DEHYDROGENATION PERIOD

Patented Nov. 18, 1952

2,618,667

UNITED STATES PATENT OFFICE 2,618,667

CATALYTIC CONVERSION PROCESS

George H. Hanson, Bartlesville, Okla., assignor to Phillips Petroleum Company, a corporation of Delaware Application October 31, 1946, Serial No. 706,978

6 Claims. (Cl. 260—676)

This invention relates to means for synchronizing the variation in catalyst activity and the resultant variation in the composition of the reactor effluent with the operation of a purification system wherein the desired and undesired products are separated from each other. More specifically, this invention relates to a means for changing feed entries to a liquid-liquid contactor to correspond to changes in feed composition caused by reduced catalyst activity in the conversion unit. In particular this invention pertains to the method of handling the first stage catalytic dehydrogenation effluent in a process for conversion of normal butane to butadiene. As the dehydrogenation reaction proceeds the catalyst activity gradually decreases to the deposition of carbon on the surface of the catalyst. This reduced catalyst activity results in a change in the composition of the stream being introduced to the purification system. This variation in stream composition makes it difficult to maintain constant percentages of impurities in the raffinate and extract streams from the liquid-liquid contactor.

The variation of the composition of the converter effluent during the dehydrogenation period in connection with the catalytic dehydrogenation of normal butane to normal butylenes is shown by the data given in the table.

Figure 1:
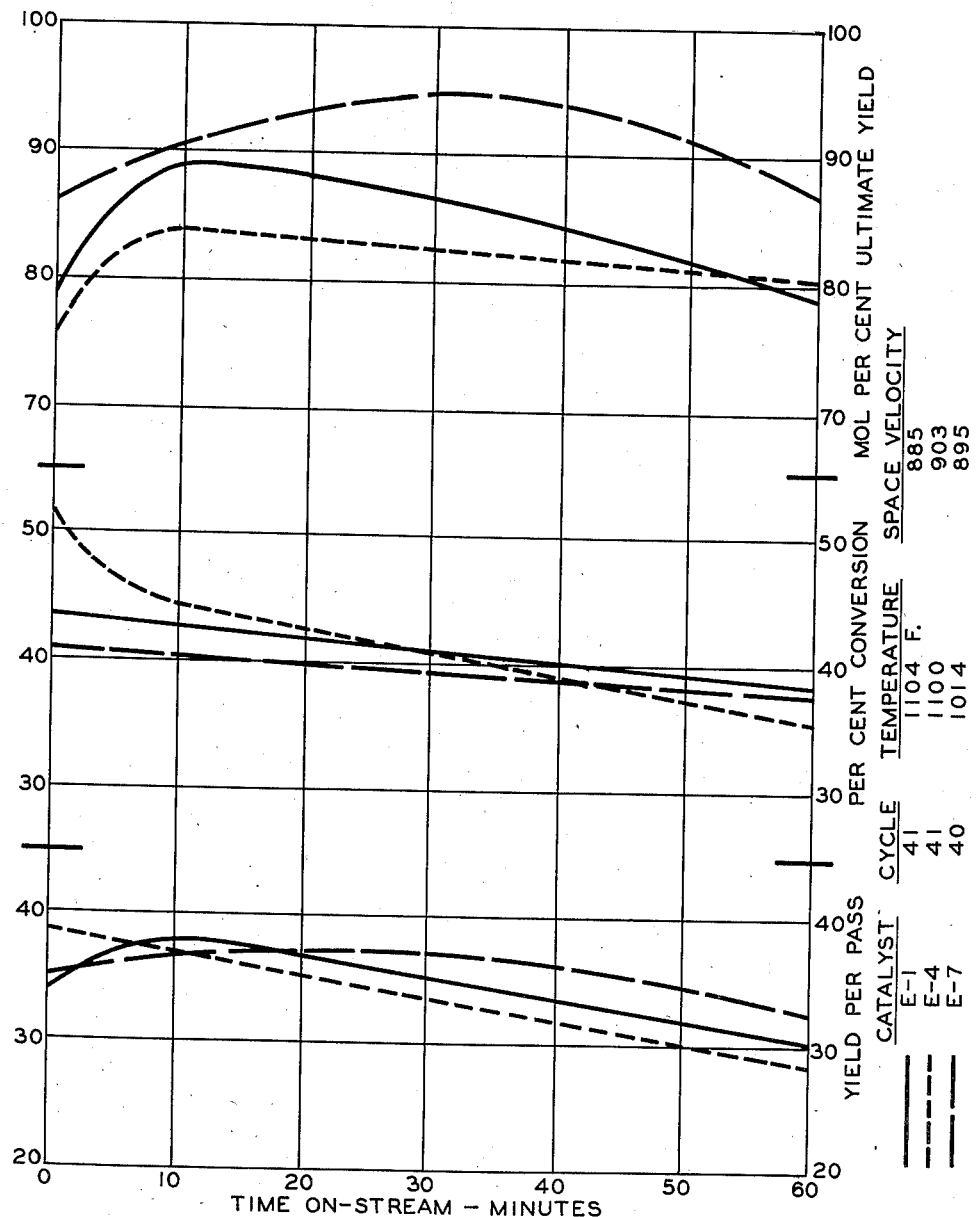
Figure 2:
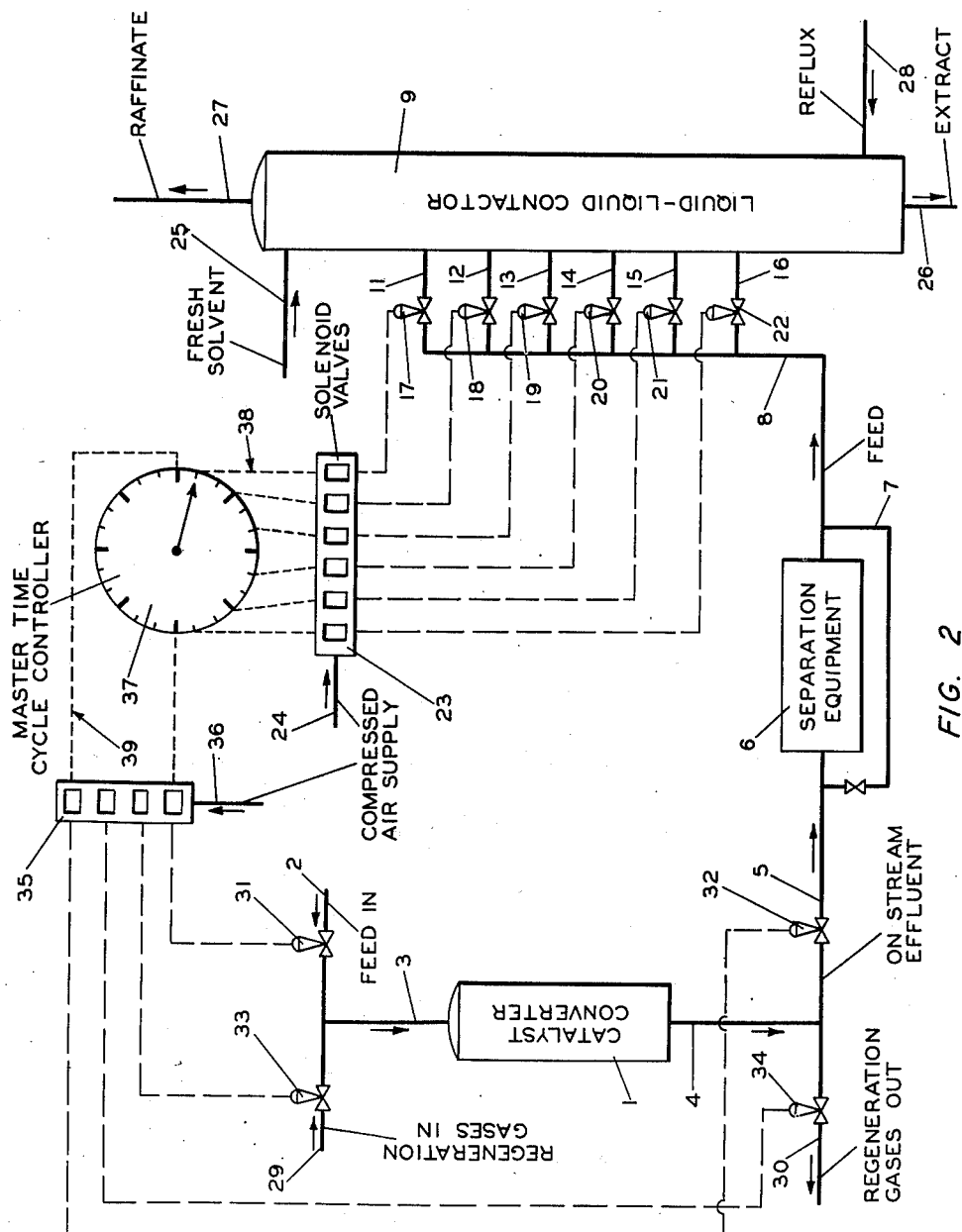

In the accompanying drawings: Fig. 1 is a plot of the variation of conversion, ultimate yield and yield per pass with length of time on-stream in dehydrogenation of normal butane to normal butylenes; Fig. 2 is a representation of one arrangement of equipment which is very suitable for carrying out the present invention.

TABLE

VARIATIONS DURING DEHYDROGENATION PERIOD

*Dehydrogenation of normal butane to normal butylenes*

E-1 CHROME OXIDE-ALUMINA CATALYST

| | | | | | | |
|---|---|---|---|---|---|---|
| Date [1] | 3-24 | 3-24 | 3-24 | 3-24 | 3-24 | 3-24 |
| Time [2] | 22:00 | 22:05 | 22:10 | 22:30 | 22:55 | 22:00 |
| Run—Cycle | 63-41 | 63-41 | 63-41 | 63-41 | 63-41 | 63-41 |
| Type of sample | 5 min. composite | 5 min. snap | 10 min. snap | 30 min. snap | 55 min. snap | 60 min. composite |
| Catalyst age—Hours [3] | 106.5 | 106.6 | 106.7 | 107.0 | 107.4 | 106.5 |
| Temperature, F.: | | | | | | |
| Flue gas | 1,226 | 1,226 | 1,246 | 1,240 | 1,234 | 1,235 |
| Preheat tube wall | 1,075 | 1,075 | 1,075 | 1,112 | 1,095 | 1,101 |
| Preheat gas | 1,060 | 1,060 | 1,070 | 1,089 | 1,083 | 1,084 |
| Catalyst tube wall | 1,093 | 1,093 | 1,094 | 1,112 | 1,103 | 1,104 |
| Catalyst bed [4] | 1,090 | 1,090 | 1,090 | 1,116 | 1,113 | 1,108 |
| Butane feed rate, s. c. f. h. (Ideal) | 190 | 190 | 190 | 190 | 190 | 190 |
| Space velocity | 885 | 885 | 885 | 885 | 885 | 885 |
| Pressure, p. s. i. g.: | | | | | | |
| Inlet of preheat coil | 10 | 10 | 11 | 12 | 12 | 12 |
| Outlet of catalyst tube | 2.1 | 2.1 | 2.1 | 2.1 | 2.1 | 2.1 |
| Fractional analysis (Mol percent): | | | | | | |
| $H_2$ | 29.83 | 28.52 | 30.27 | 30.75 | 27.35 | 29.65 |
| $CH_4$ | 5.35 | 2.75 | 2.67 | 2.75 | 3.00 | 4.32 |
| $C_2H_4$ | 0.49 | 0.24 | 0.34 | 0.55 | 0.59 | 0.29 |
| $C_2H_6$ | 1.89 | 1.28 | 1.34 | 1.70 | 1.50 | 1.43 |
| $C_3H_6$ | 1.17 | 0.79 | 0.83 | 0.97 | 1.03 | 0.93 |
| $C_3H_8$ | 0.68 | 0.53 | 0.55 | 0.59 | 0.61 | 0.62 |
| $C_4H_8+C_4H_6$ | 23.64 | 25.35 | 25.46 | 23.65 | 21.68 | 23.36 |
| $C_4H_{10}$ | 36.05 | 39.64 | 37.74 | 38.10 | 43.42 | 38.42 |
| $C_5+$ [5] | 0.90 | 0.90 | 0.80 | 0.94 | 0.82 | 0.98 |
| | 100.00 | 100.00 | 100.00 | 100.00 | 100.00 | 100.00 |
| Expansion factor | 1.5170 | 1.4578 | 1.4888 | 1.4960 | 1.4310 | 1.4910 |
| Percent conversion | 44.61 | 41.51 | 43.11 | 42.30 | 37.17 | 42.02 |
| Mol percent ultimate yield | 80.39 | 89.03 | 87.91 | 83.64 | 83.46 | 82.89 |
| Yield per pass | 35.86 | 36.96 | 37.90 | 35.38 | 31.02 | 34.83 |
| Pounds of coke ($CH_{0.33}$) deposited | | | | | | 0.28 |
| Percent unsats ($Br_2$ Orsat) | 27.8 | 27.8 | 28.4 | 28.6 | 27.0 | 28.1 |

[1] All dates are 1945.
[2] Basis: 0 to 24 o'clock; for 60 minute composite sample time reported is time at start of cycle.
[3] Regeneration time included.
[4] Thermocouple in catalyst bed located 6 inches from bottom of bed.
[5] $C_5+=C_6H_7$ (estimate).

A graphical presentation of the variation of conversion, ultimate yield and yield per pass during a dehydrogenation period is given in Fig. 1.

The principal object of this invention is to provide an improved apparatus for recovering a desired product from an impure feed stream by liquid-liquid extraction.

Another object is to provide an improved apparatus for carrying out a catalytic conversion and recovering a desired product from the conversion effluent by liquid-liquid extraction.

Another object of this invention is to provide means for synchronizing the operations of liquid-liquid contactors with the operations of catalytic converters in a two-stage dehydrogenation process for the manufacture of butadiene from normal butane. The dehydrogenation of normal butane to normal butylenes is accomplished in the first stage, and the dehydrogenation of normay butylenes to butadiene is accomplished in the second stage.

Numerous other objects of this invention will more fully hereinafter appear.

This invention provides a means for overcoming the above-mentioned difficulties by changing the position of the feed entry to the liquid-liquid contactor to correspond to changes in the feed stream composition, that is by changing the position of the feed entry to correspond to the variation in catalyst activity in the conversion unit. Thus, in the case of dehydrogenation of normal butane to normal butylenes, this invention makes possible the withdrawal from the top of the contactor of raffinate containing a constant percentage of normal butane and the withdrawal from the bottom of the contactor of extract containing a constant percentage of normal butylenes. This invention is also advantageous in that it minimizes the necessity of providing surge tanks for leveling out the fluctuations in feed composition. When the feed to a liquid-liquid contactor is introduced at the proper point, a given separation can be accomplished with minimum quantities of solvent and reflux, or with given solvent and reflux rates a better separation can be obtained. There is also a structural advantage; when lower solvent and reflux rates can be used, it is possible to employ a smaller diameter column which results in reduced steel requirements.

The present invention resides in apparatus for carrying out catalytic conversions and recovering a desired component of the conversion effluent comprising in combination a catalytic converter having an inlet and outlet for the admission of raw material and the outflow of conversion products, a vertical liquid-liquid extraction column, conduit means connecting the outlet of the converter and said column and arranged to discharge into said column through a plurality of feed inlets at different selective levels therein, valves in said feed inlets, valves in said inlet and outlet of said converter, automatic operating means for said valves, and common timing means for said operating means arranged to selectively hold open that one of said first-named valves which will maintain overhead and bottom product streams of constant composition from said extraction column.

In a preferred embodiment the catalytic converter is additionally provided with an inlet and an outlet for the admission of regeneration gas and the outflow of regeneration effluents, valves being likewise provided in the inlet and outlet, and the common timing means is arranged not only to selectively hold open that valve in the feed inlets which will maintain overhead and bottom product streams of constant composition from the liquid-liquid extraction column but also to close the valves in the feed inlets to the column while the valves in the inlet and outlet for the admission of raw material to and the outflow of conversion products from the converter are closed and the valves in the inlet and outlet for the admission of regeneration gas to and the outflow of regeneration gas from the converter are open.

Any suitable vertical liquid-liquid extraction column may be employed. Such columns are arranged to effect continuous countercurrent extraction of the incoming feed stream with the solvent. A continuous stream of the solvent is fed into the top of the column and descends therein picking up the desired component of the feed. The feed is introduced continuously at a point below the top of the column and rises countercurrently to the downflowing solvent. The raffinate, i. e. extracted feed stream continuously leaves the top of the column and the enriched stream of solvent reaching the bottom of the column is withdrawn continuously therefrom.

The enriched solvent (the extract) is fed to a suitable stripping column wherein the dissolved components are vaporized from the solvent usually by heating. The stripped solvent is cooled and recycled to the top of the liquid-liquid extraction column. The stripped material constitutes one product of the process.

It is highly desirable to introduce a portion of the product stripped from the extract into the bottom of the extraction column. This is known as reflux or enriching liquid and serves to displace any undesirable material dissolved therein. For example when liquid-liquid extraction is employed to separate hydrocarbons of varying degrees of unsaturation, the more unsaturated hydrocarbon (such as butene) is extracted by the solvent and introduction of a portion of this more unsaturated hydrocarbon into the bottom of the extraction column serves to displace any less unsaturated hydrocarbon (such as butane) from solution in the solvent, thus giving a better separation and purer product streams.

The liquid-liquid extraction column is usually, if not invariably, provided with means for insuring the desired intimacy of contact. Examples of suitable contacting means are trays, baffles, packing, etc. The trays may be equipped with orifices, jets or eductors of known type.

The vertical extraction column is provided with a plurality of feed inlets at different vertical heights along the column. These feed inlets are connected to a single vertical conduit to form a manifold and each of the inlets is provided with a valve, preferably a motor valve, for opening and closing the same and thereby allowing and shutting off flow therethrough into the column.

The invention is especially applicable to catalytic dehydrogenation of hydrocarbons to produce less saturated hydrocarbons such as the dehydrogenation of normal butane to produce normal butenes, and usually some butadiene or the dehydrogenation of normal butene to butadiene. In such case the solvent used in the extraction column is one which preferentially dissolves the more unsaturated hydrocarbon content while allowing the more saturated hydrocarbon content to pass through undissolved. Thus in the manufacture of butadiene by two-stage catalytic dehydrogenation of normal butane in accordance with Hachmuth U. S. Patent 2,386,310 extractive distillation is performed to resolve a mixture of normal butane and butene-2 recovered from the first stage effluent and another extractive distillation is carried out to separate butene-2 and butadiene from admixture with other $C_4$ hydrocarbons derived from the second stage effluent. My invention contemplates the use of liquid-liquid extraction in place of such extractive distillation and, if desired, in place of part of the fractional distillation operations also commonly employed in such manufacture.

Many solvents may be used in the liquid-liquid extraction step. Examples of solvents for use in separating aliphatic hydrocarbons of different degrees of unsaturation are furfural, ethanolamine, etc. The solvent employed will, of course, be dependent primarily upon the type of catalytic conversion carried out and the product or products being made. The major application of my invention is to catalytic hydrocarbon conversions wherein a hydrocarbon feed is contacted with a solid catalyst, examples being dehydrogenation, cyclization, aromatization, cracking, etc., and wherein the conversion effluent contains at least two hydrocarbons which are to be separated from one another by liquid-liquid extraction. The hydrocarbons to be separated in the extraction column may be unconverted hydrocarbon on the one hand and one or more conversion products on the other. Or the liquid-liquid extraction step may be used to separate between two or more conversion products as for example to separate butene-1 from butadiene contained in the effluent from the catalytic dehydrogenation of normal butane primarily to normal butenes.

The dehydrogenation effluent is invariably treated intermediate the converter and the extraction column in known manner to recover a concentrate of aliphatic hydrocarbons having the same number of carbon atoms, such as the $C_4$ hydrocarbons, or a portion of less than all of such hydrocarbons present in the effluent. For example some of the $C_4$ hydrocarbons may be separated by ordinary fractional distillation. Thus butene-1 and butadiene may be separated from butene-2 and normal butane by conventional fractionation distillation and either or both of the resulting streams may be resolved by passage to liquid-liquid contactors the feed entry to which is controlled in accordance with the present invention by the length of time the converter has been on-stream.

The feed to the extraction column must be in liquid phase and conditions in the column are such that both the feed and the solvent are in liquid phase throughout the column.

A number of considerations govern the determination of the point at which the feed should enter the extraction column. Some of these considerations are indicated in the following:

The feed preferably should enter the column at a point where its composition approximates the composition of the hydrocarbon-rich or raffinate phase. Another consideration is that the feed entry point should be such that the temperature or heat balance in the column is not upset since this would interfere with the rate of mass transfer and prevent proper operation of the column. For example, if relatively cold feed were introduced into a portion of the column where the temperature were higher, the operation of the column, that is its heat balance, would be dangerously upset and the result would be wholly improper operation. These are only a few of the considerations which enter into selection of the proper feed entry point. Those skilled in the art will be able readily to determine the proper points of feed entry in the light of this specification and in the light of the present knowledge of the art.

The activating mechanisms for the motor valves in the feed entries are interlocked with the time cycle device which controls the periodic opening and closing of the hydrocarbon and regeneration valves of the catalyst cases. Thus in the case of a feed of normal butane and normal butylene, the feed entry used is automatically varied in accordance with the variation of the normal butylene content of the feed to the liquid-liquid contactor. In the case of a feed of butadiene and butene-2, the point of feed entry is similarly varied in accordance with the content of butadiene in the feed.

With this invention it is possible to synchronize the operation of a liquid-liquid contactor with the activity of the catalyst in the converter when the composition of the feed to the contactor is variable but can be predicted by the length of time the converter has been on stream or can be measured instantaneously and continuously.

Referring now to Fig. 2 the accompanying drawing, the catalytic converter is designated by reference numeral 1. The feed enters via lines 2 and 3 and the effluent leaves via lines 4 and 5 and is passed to separation equipment 6 of any suitable type for the separation of any suitable fraction which contains the desired product or products and constitutes the feed to the liquid-liquid extraction column 9. In some cases the conversion effluent is adapted to be used directly as the feed to the liquid-liquid extraction step in which case the separation equipment may be dispensed with as indicated by the by-pass line 7. The feed passes via line 8 to vertical liquid-liquid extraction column 9 which is provided with a plurality of feed lines 11, 12, 13, 14, 15 and 16 equipped with motor valves 17, 18, 19, 20, 21 and 22 respectively which are actuated by compressed air the flow of which is controlled by the action of solenoid valves designated generally by reference numeral 23. Compressed air (from a source not shown) is supplied to unit 23 via line 24 and is connected to motor valves 17 to 22 by the conduits shown.

Fresh solvent (including stripped solvent and any make-up solvent added to make up for system losses) is introduced continuously into the top of column 9 via line 25 and descends therein in intimate countercurrent relationship with the ascending feed. The rich solvent, i. e. the extract, leaves the bottom of column 9 via line 26. The extracted feed, i. e. the raffinate, leaves the top of column 9 via line 27.

The extract is passed to a stripping column (not shown) wherein it is treated in known manner to separate the material dissolved in the solvent and to recover the lean solvent which is cooled if necessary and recycled to line 25. A suitable portion of the stripped material is liquefied and injected continuously into the bottom of column 9 via line 28 as reflux to increase the purity of the material dissolved in the extract by displacing material which it is desired should appear in the raffinate.

When the converter 1 is on regeneration, the regeneration gases enter via line 29 and leave via line 30. Lines 2, 5, 29 and 30 are provided with air-actuated motor valves 31, 32, 33 and 34 respectively which are activated by solenoid valves indicated by unit 35. The solenoid valve manifold of unit 35 is supplied with compressed air entering via line 36 and connected to valves 31, 32, 33 and 34 by the air lines shown.

A master time-cycle controller 37 is provided to control the opening and closing a valves 31, 32, 33 and 34 and also of valves 17 to 22 in the feed inlet lines 11 to 16 to column 9. Time-cycle controller 37 may be of any known type, such as for example a "Taylor Flex-O-Timer" described in the June, 1940 edition of Bulletin 98154 of the Taylor Instrument Company or of any other type such as that described on pages 554 and 555 of "Industrial Instruments for Measurement and Control" by T. J. Rhodes, published by McGraw-Hill, 1941 or on pages 140 and 144 of the May, 1943 issue of Chemical and Metallurgical Engineering.

Time-cycle controller 37 is connected by electric wires indicated generally by reference numeral 38 to the solenoid valve manifold 23 and by wires 39 to solenoid valve unit 35. As the converter 1 remains on-stream and the activity of the catalyst is reduced, as because of carbon deposition, the master time-cycle controller 37 sends out electrical impulses to the solenoid valves 23 which thereupon either apply air pressure to or release air pressure from the diaphragms of motor valves 17 to 22 causing the valves to open or close as desired. Thus at any given time during the on-stream portion of the conversion cycle the most desirable or optimum feed entry line of the lines 11 to 16 is employed for the entry of the feed into column 9, and as the composition of the feed changes with length of time on-stream the point of feed entry is automatically changed, so as to maintain essentially constant the composition of the material leaving in the raffinate and the material dissolved in the extract leaving via line 26.

For example the composition of the feed to column 9 is such that line 16 is the optimum feed inlet, the controller 37 sends out impulses to solenoid valves 23 to open valve 22 in line 16 and leave valves 17 to 21 in lines 11 to 15 closed. As the conversion cycle proceeds the composition of the feed stream changes in such manner that the optimum feed entry is line 15 whereupon valve 21 in line 15 is opened, valve 22 in line 22 is closed and valves 17 to 20 in lines 11 to 14 remain closed.

It will be understood that time-cycle controller 37 controls the admission of feed or of regeneration gases to converter 1 and the exit of conversion effluent or regeneration gases by means of wires 39 which send electrical impulses to solenoids 35 which control the application of air to motor valves 31 to 34 in such a manner as to maintain converter 1 on-stream for the proper period of time during which the conversion effluent is passed via lines 5 and 8 to extraction column 9, whereupon the converter 1 is switched to regeneration for the proper period of time during which the converter effluent is withdrawn via line 30. If only a single catalytic converter is being employed, all the feed lines 11 to 16 to column 9 are closed and normal operation of column 9 is discontinued while the converter 1 is on regeneration. For simplicity the discussion is limited to one converter, but it will be understood that generally two or more converters are used, one or more being on regeneration cycle while the other or others are on conversion cycle. With such an arrangement it will not be necessary to close the feed lines to the column 9 while regeneration is being effected.

It will also be understood that instead of compressed air-actuated motor valves, I may use motor valves actuated in any manner by impulses sent out by the timer 37. Thus electrically operated motor valves may be employed.

In the case of a selective solvent lighter than the hydrocarbon feed being extracted, appropriate changes in the points of entry and exit of the various streams to the liquid-liquid contactor 9 would be necessary in order to obtain satisfactory operation. Such changes will be obvious to those skilled in the art in the light of this specification taken in conjunction with the present knowledge of the art. Thus if the selective solvent is lighter than the feed, it may be introduced to the bottom of the column 9 and the reflux or enriching liquid may be introduced into the top of the column, the extract being taken off from the top and the raffinate being taken off from the bottom.

I claim:

1. A process for effecting the catalytic conversion of hydrocarbons wherein the reaction effluent varies in composition due to progressive variation in the activity of the catalyst, which comprises contacting a conversion catalyst in a conversion zone with a hydrocarbon under conversion conditions so as to produce an effluent comprising a plurality of hydrocarbons one of which is solvent-extractable; introducing said effluent in liquid phase into a liquid-liquid extraction zone as a feed thereto at successively varying levels; passing a selective solvent for one of said hydrocarbons through said extraction zone countercurrently to the feed thereto under conditions which effect selective separation of the desired hydrocarbon; withdrawing raffinate from one end of said extraction zone and extract from the other; and automatically varying the level of introduction of the feed to said extraction zone in accordance with a predetermined time cycle coordinated with variations in composition of said feed so as to maintain a product stream of constant composition.

2. A process for effecting the catalytic conversion of hydrocarbons wherein the reaction effluent varies in composition due to progressive variation in the activity of the catalyst, which comprises contacting a conversion catalyst in a conversion zone with a hydrocarbon under conversion conditions so as to produce an effluent comprising a plurality of hydrocarbons one of which is solvent-extractable; introducing said effluent in liquid phase into a liquid-liquid extraction zone as a feed thereto at successively varying levels; passing a selective solvent for one of said hydrocarbons through said extraction zone countercurrently to the feed thereto under conditions which effect selective separation of the desired hydrocarbon; withdrawing raffinate form one end of said extraction zone and extract from the other; and automatically varying the level of introduction of the feed to said extraction zone in accordance with a predetermined time cycle coordinated with variations in composition of said feed so as to extract all of said solvent-extractable hydrocarbon and maintain a product stream of constant composition.

3. A process for catalytically dehydrogenating a hydrocarbon of higher saturation to a hydrocarbon of lower saturation in which the activity of the catalyst gradually decreases with concomitant change in the composition of the effluent from the reaction zone, which comprises contacting a dehydrogenation catalyst with a hydrocarbon feed stream at least as saturated as a mono-olefin in a dehydrogenation zone under dehydrogenation conditions so as to convert only a portion of the feed to less saturated hydrocarbon; introducing the resulting mixture of hydrocarbons in liquid phase into a liquid-liquid extraction zone as a feed at successively varying levels; passing a selective solvent for the less saturated hydrocarbon through said extraction zone countercurrently to the feed thereto under conditions which effect selective separation of said less saturated hydrocarbon; withdrawing raffinate comprising hydrocarbon of higher saturation from one end of said extraction zone and less saturated hydrocarbon-solvent solution from the other; and automatically varying the level of introduction of the feed to said extraction zone in accordance with a predetermined time cycle coordinated with variations in composition of said feed so as to maintain a raffinate of constant composition.

4. The process of claim 3 in which the feed to the reaction zone is a mixture of butenes, the feed to the extraction zone is a mixture of butenes and butadiene, and the solvent is furfural.

5. The process of claim 3 in which the feed to the reaction zone is normal butane and the feed to the extraction zone is a mixture of normal butane and butenes.

6. A process for effecting the catalytic conversion of hydrocarbons wherein the reaction effluent varies in composition due to progressive variation in the activity of the catalyst which comprises contacting a conversion catalyst in a conversion zone with a hydrocarbon under conversion conditions so as to produce an effluent comprising a plurality of hydrocarbons one of which is solvent-extractable; introducing said effluent in liquid phase into a liquid-liquid extraction column as a feed thereto at successively varying levels through a series of automatically regulable valved conduits; passing a selective solvent for one of said hydrocarbons through said extraction column countercurrently to the feed thereto under conditions which effect selective separation of the desired hydrocarbon; withdrawing raffinate from one end of said extraction column and extract from the other; and automatically varying the level of introduction of feed to said extraction column by regulating the valves in said valved conduits in response to the timing cycle of a timing controller, said timing cycle being coordinated with variations in composition of said reaction effluent so as to maintain a product stream from said extraction column of predetermined constant composition.

GEORGE H. HANSON.

REFERENCES CITED

The following references are of record in the file of this patent:

UNITED STATES PATENTS

| Number | Name | Date |
|---|---|---|
| 2,339,560 | De Simo | Jan. 18, 1944 |
| 2,367,671 | Dickinson et al. | Jan. 23, 1945 |
| 2,419,528 | Biegel | Apr. 29, 1947 |

OTHER REFERENCES

The Houdry Catalytic Process by O. W. Willcox, Annual Refinery Issue, 1939, page 15.